United States Patent
Yabe et al.

(10) Patent No.: US 7,543,028 B2
(45) Date of Patent: Jun. 2, 2009

(54) ELECTRONIC MAIL DISTRIBUTION METHOD, COMMUNICATIONS TERMINAL, AND SERVER DEVICE

(75) Inventors: Toshiyasu Yabe, Yokohama (JP); Makoto Soga, Minato-ku (JP); Tomoko Enatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 169 days.

(21) Appl. No.: 10/517,623

(22) PCT Filed: Jun. 5, 2003

(86) PCT No.: PCT/JP03/07136

§ 371 (c)(1),
(2), (4) Date: Sep. 16, 2005

(87) PCT Pub. No.: WO03/105426

PCT Pub. Date: Dec. 18, 2003

(65) Prior Publication Data

US 2006/0101117 A1    May 11, 2006

(30) Foreign Application Priority Data

Jun. 6, 2002   (JP) ............................. 2002-166231

(51) Int. Cl.
   *G06F 15/16* (2006.01)
(52) U.S. Cl. .................................................... 709/206
(58) Field of Classification Search ................. 709/203, 709/206
See application file for complete search history.

(56) References Cited

U.S. PATENT DOCUMENTS

| 6,275,850 | B1 * | 8/2001 | Beyda et al. ................. 709/206 |
| 7,117,246 | B2 * | 10/2006 | Christenson et al. ........ 709/206 |
| 2001/0007992 | A1 | 7/2001 | Nakaoka |
| 2002/0016818 | A1 * | 2/2002 | Kirani et al. ................. 709/203 |
| 2002/0116575 | A1 | 8/2002 | Toyomura et al. |
| 2002/0138586 | A1 * | 9/2002 | Paleiov et al. ............... 709/207 |
| 2004/0049696 | A1 * | 3/2004 | Baker et al. .................. 713/201 |

(Continued)

FOREIGN PATENT DOCUMENTS

CN        1293851 A       5/2001

(Continued)

OTHER PUBLICATIONS

Office Action issued May 11, 2007 in Chinese Patent Application No. 03813088.2 (with translation).

(Continued)

*Primary Examiner*—Ario Etienne
*Assistant Examiner*—Hee Soo Kim
(74) *Attorney, Agent, or Firm*—Brinks Hofer Gilson & Lione

(57) ABSTRACT

Mobile phone 100-1 adds information that indicates the extensions of attachment files the user desires to obtain to an HTTP request for obtaining e-mail, and sends the HTTP request to a mail server 400. When mail server 400 receives the HTTP request, it compares the files attached to the e-mail with information included in the HTTP request, and determines whether to send the attachment files. In a case where it is determined not to send an attachment file, mail server 400 deletes the attachment file from the e-mail, and sends the e-mail from which the attachment has been deleted to mobile phone 100-1.

17 Claims, 13 Drawing Sheets

U.S. PATENT DOCUMENTS

2005/0124337 A9 * 6/2005 Gresham et al. ............ 455/431

FOREIGN PATENT DOCUMENTS

| CN | 1303201 A | | 7/2001 |
|---|---|---|---|
| EP | 1 061 701 A1 | | 1/2000 |
| EP | 1 061 701 A1 | | 12/2000 |
| JP | 11272582 A | * | 10/1999 |
| JP | H11-272582 A | | 10/1999 |
| JP | 2000-209261 A | | 7/2000 |
| JP | 2001-257709 A | | 9/2001 |
| JP | 2002-123469 A | | 4/2002 |
| JP | 2002-149458 A | | 5/2002 |
| JP | 2002-344526 A | | 11/2002 |
| JP | 2002-374306 A | | 12/2002 |

OTHER PUBLICATIONS

Japanese Office Action mailed Nov. 7, 2006 and its translation.

Toshiyasu Yabe, "Special issue on i-mode service, i-mode server," NTT DoCoMo Technical Journal, vol. 7, No. 2, pp. 22-27, Jan. 1, 2002.

Office Action for Japanese Patent Application No. JP2004-512365 (With Translation).

Tomoo Yamaguchi, Special Report on IMT-2000, Service (3) Birth of "FOMA"-Pioneer in Mobile New Century, NTTDoCoMo Technical Journal, Jan. 1, 2002, vol. 9, No. 4, p. 1-16 (Concise Explanation of Relevance).

* cited by examiner

FIG. 2

| NAME | TERMINAL IDENTIFIER | PHONE NUMBER | ADDRESS | E-MAIL ADDRESS |
|---|---|---|---|---|
| DENWA TARO | MS0000001 | 0*0-****-???? | ..., TYUOU WARD, TOKYO | taro@abc.co.jp |
| DENWA HANAKO | MS0000002 | 0*0-**-** | ..., YOKOHAMA WARD, KANAGAWA | hanako@abc.co.jp |
| DENSHIN ICHIRO | MS0000003 | 0*0-%%%%-#### | ..., CHIBA WARD, CHIBA | ichiro@abc.co.jp |
| DENSHIN JIROU | MS0000004 | 0*0-&&&&-???? | ..., MINATO WARD, TOKYO | jirou@abc.co.jp |

FIG. 5

POST http://abc.co.jp/send.cgi HTTP/1.1
HOST:abc.co.jp
User-Agent: abc/2.0 MS000001
Content-Type: application/x-www-forum-rulencoded;charset=Shift-JIS
Content-Length: 9999
⋮

FIG. 6

GET http://abc.co.jp/receive.cgi?ATT=jpeg HTTP/1.1
HOST:abc.co.jp
User-Agent: abc/2.0 MS000001
X-ID: 0001
⋮

```
GET http://abc.co.jp/receive.cgi?ATT=jpeg HTTP/1.1
HOST:abc.co.jp
User-Agent: abc/2.0 MS000002
X-ID: 0001
          .
          .
          .
```

```
GET http://abc.co.jp/receive.cgi?ATT=jpeg+mdi+gif HTTP/1.1
HOST:abc.co.jp
User-Agent: abc/2.0 MS000001
X-ID: 0001
           .
           .
           .
```

ELECTRONIC MAIL DISTRIBUTION METHOD, COMMUNICATIONS TERMINAL, AND SERVER DEVICE

TECHNICAL FIELD

The present invention relates to distribution of e-mail with file attachments to communications terminals.

BACKGROUND

In recent years, the sending and receiving of e-mail with image and sound file attachments using handheld communications terminals such as mobile phones, PDAs (Personal Digital Assistants), and general-purpose personal computers, has become popular.

However, with devices for sending and receiving e-mail, there is a concern that arises from the problem of being unable to use files attached to the e-mail because the functions of various hardware devices are device-dependent, even when the device is capable of receiving e-mail with file attachments. For example, some mobile phone cannot open JPEG (Joint photographic Coding Experts Group) formatted image files, even if it can receive e-mail with image files attached that comply with JPEG format. In General, the size of attachment file is larger than the text, it is thus apparent that receiving e-mail by a device which cannot open the email is time-consuming for the user. In addition, especially for mobile phones with limited hardware resources, a problem will arise where other functions of the mobile phone may be restricted during reception of that files attached to e-mail. This is not a negligible problem.

It is possible to ask the user of a mobile terminal whether to receive attachments every time a mail server receives e-mail destined for the mobile terminal. In this case, however, usability of the mobile terminal will significantly be reduced.

In order to solve these problems, a technology disclosed in JP2001-217860A for converting a file format into a format compatible to a mobile phone. Specifically, a server apparatus converts a format of a file which cannot be handled by the mobile phone into a format which can be handle by the mobile phone, so as to create e-mail with the converted files attached, and send it to a mobile phone.

However, it is often a case where a large number of terminals access a mail server at one time, the technology disclosed in JP2001-217860A will result in heavy server loads due to the format conversions.

Further, there are many kinds of terminals accessing to the server, the server is required to employ a number of conversion methods in compliance with the kinds. Thus, the server loads further increases.

It is possible to perform the format conversions in a commutation terminal not in a server apparatus. In this case, however, especially for devices which are not good in performance such as mobile phones, even if the devices can perform the format conversions, a significant amount of time is went to the format conversions. Thus, the format conversion by means of terminal devices is not realistic.

To reduce the format conversions in a server apparatus, a technology has been developed, in which a server apparatus sends to mobile phones a notification indicating that the file conversions have been failed, when the server apparatus receives e-mail with an attachment file which the server cannot convert. In other words, the server apparatus sends to the mobile phones only a part of a number of e-mail with attachment files. The server apparatus that performs the format conversions is furnished with device compatibility profiles that indicate which file formats are compatible with the mobile phones.

In this case, however, types of attachment files that a mobile phone can receive depend only on the type of the mobile phones and thus cannot be changed. Specifically, any type of attachment files that can be handled by a mobile phone is sent to the mobile phone even if a user of the mobile phone does not wish to receive it. In other words, a user cannot choose attachment files to be received.

The present invention has been made in view of the above circumstances, to provide e-mail distribution methods, communications terminals, server apparatus, programs, and storage media, so that the communications terminals can receive only attachment files which the user wishes to receive.

BRIEF SUMMARY

The present invention addresses the above problems with an e-mail distribution method for sending e-mail with attachment file from a server apparatus to a communications terminal, the method comprising: an obtaining step of obtaining type information that identifies a type of an attachment file which a user of the communications terminal wishes to receive, a sending step of sending the type information to said server apparatus from the communications terminal; a receiving step of receiving the type information in the server apparatus; a step of determining, at the server apparatus, whether a type of an attachment file of e-mail, which is destined for the communications terminal and received by the server apparatus, is identical to a type identified by the type information; and a step of sending from the sever apparatus to the communications terminal e-mail from which the attachment file is deleted, when the type of the attachment file of the e-mail is not identical to the type identified by the type information, and transferring the e-mail from the server apparatus to the communications terminal, when the type of the attachment file of the e-mail is identical to the type identified by the type information.

The present invention further provides a communications terminal comprising: an obtaining means for obtaining type information that identifies a type of an attachment file which a user of the communications terminal wishes to receive; a transmitting means for transmitting the type information to a server apparatus; and a receiving means for receiving e-mail from the server apparatus.

The present invention further provides a server apparatus comprising: means for receiving from a communications terminal type information that identifies a type of an attachment file which a user of the communications terminal wishes to receive; means for determining whether a type of an attachment file of e-mail, which is destined for the communications terminal and received by the server apparatus, is identical to a type identified by the type information; and means for sending to the communications terminal e-mail from which the attachment file is deleted, when the type of the attachment file of the e-mail is not identical to the type identified by the type information, and transferring the e-mail to the communications terminal, when the type of the attachment file of the e-mail is identical to the type identified by the type information.

The present invention further provides a computer program for causing a computer to perform the functions of: means for obtaining type information for specifying a type of an attachment file that the user of the computer wishes to receive; means for sending the type information to a server apparatus; and means for obtaining e-mail from the server apparatus.

The present invention further provides a computer readable storage medium which stores that program.

The present invention further provides a computer program for causing a computer to perform the functions of: means for receiving from a communications terminal type information that identifies a type of an attachment file which a user of the communications terminal wishes to receive; means for determining whether a type of an attachment file of e-mail, which is destined for the communications terminal and received by the server apparatus, is identical to a type identified by the type information; and means for sending to the communications terminal e-mail from which the attachment file is deleted, when the type of the attachment file of the e-mail is not identical to the type identified by the type information, and transferring the e-mail to the communications terminal, when the type of the attachment file of the e-mail is identical to the type identified by the type information. The present invention further provides a computer readable storage medium which stores that program.

BRIEF DESCRIPTION OF THE DRAWINGS

FIG. 2 shows an example of the format of data in subscriber database 500.

FIG. 5 shows a header of an HTTP request used in a POST method sent by mobile phone 100.

FIG. 6 shows a header of an HTTP request used in a GET method sent from mobile phone 100.

DETAILED DESCRIPTION OF THE DRAWINGS AND THE PRESENTLY PREFERRED EMBODIMENTS

Figure 1:
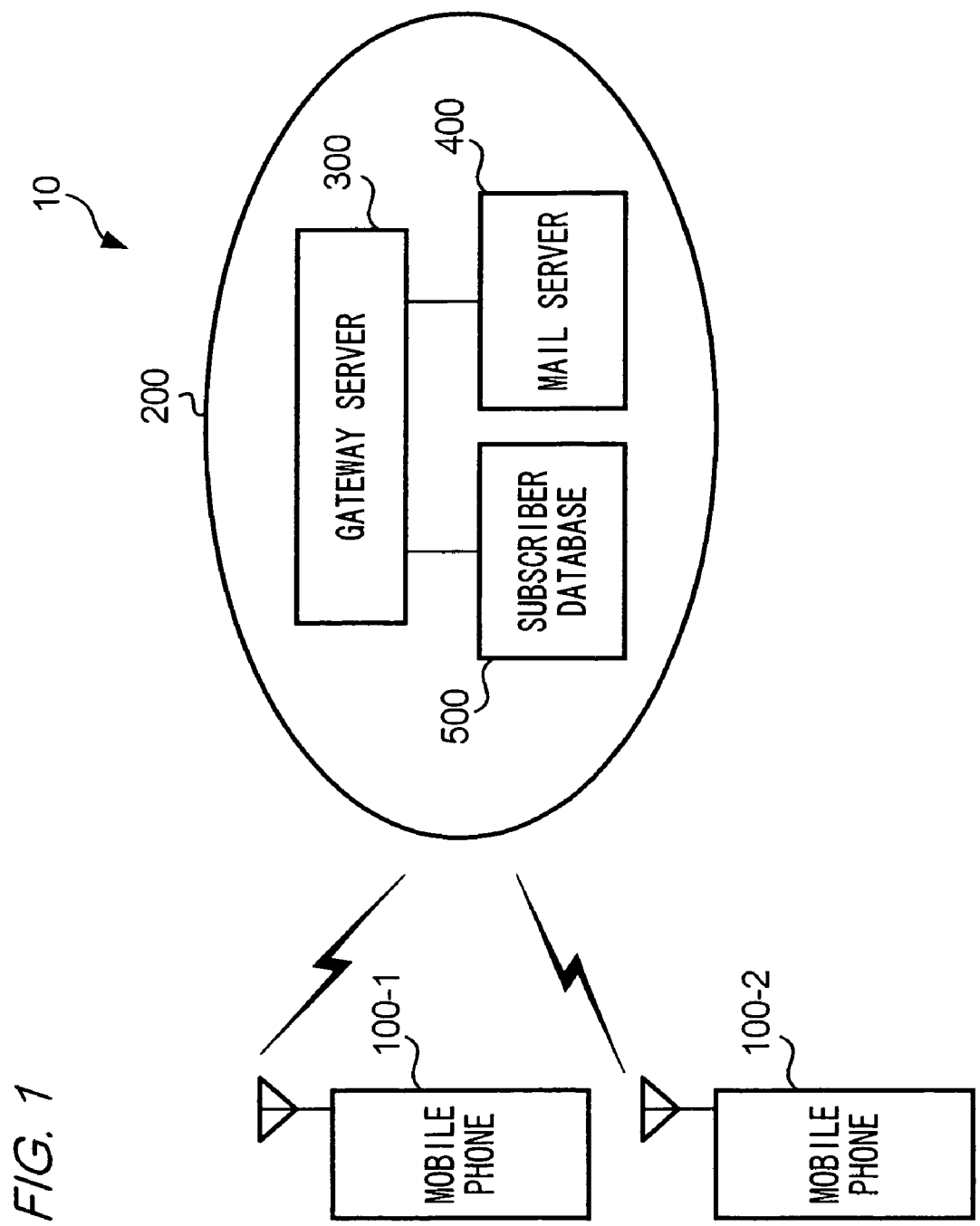
FIG. 1 shows an example of the hardware construction of the communications system according to the present invention.

In the following, a preferred embodiment of the present invention is shown referring to the drawings. However, the present invention may take the form of any embodiment within the scope of the claims, and is not restricted to these embodiments.

<1. Composition of a Preferred Embodiment>

<1-1. Overall Composition>

FIG. 1 is a figure that shows an example of the composition of communications system 100 according to the present invention. In this communication system there are a number of mobile phones, but to avoid complexity, only mobile phones 100-1 and 100-2 are depicted.

Mobile phones 100-1 and 100-2 (below, in a case where there is no particular need to distinguish between various mobile phones, abbreviated as mobile phone 100), are mobile phones owned by users (not shown). Mobile phones 100 can carry out mobile data-exchange communications through a packet communications network 200. Mobile phone 100 is furnished with functions that perform e-mail data exchange via mobile packet communications network 200. Mobile phone 100-1 is capable of using image files in JPEG format that have the extension "jpeg" and sound files in MIDI (Musical Instrument Digital Interface) format that have the extension suffix "mid", whereas mobile phone 100-2 is capable of using only image files in JPEG format with the "jpeg" extension.

The user of mobile phone 100-1 is "Denwa Taro" named in FIG. 2 and has been assigned an e-mail address "taro@abc.cojp" by the communications provider operating mobile packet communications network 200. Also, the user of mobile phone 100-2 is specified by the name "Denwa Hanako" in FIG. 2, and has been assigned an e-mail address "hanako@abc.co.jp".

Mobile packet communications network 200 is a communications network that provides data communications services; it contains wireless base stations that perform wireless communications with mobile phones accommodated in mobile packet communications network 200, a switch that is connected to wireless base stations, a gateway switch connected to the switch (none of which are shown), a gateway server 300 connected to the switch, a mail server 400, and a subscriber database 500.

With Mobile packet communications network 200, e-mail relayed between mobile phones accommodated in mobile packet communications network 200, based on a packet communication technology.

Gateway server 300 connects networks such as the Internet (not shown) with mobile packet network 200 by converting communications protocols in comply with the networks being connected. More specifically, gateway server 300 performs protocol conversions between mobile packet communications network 200 that uses a protocol suitable for a mobile packet communications and other networks that uses TCP/IP, a standard protocol that is used in other networks such as the Internet.

Mail server 400, which is connected to gateway server 300, is a server that distributes e-mail to mobile phones 100.

Subscriber database 500, which is connected to gateway server 300, is a database that stores information concerning subscribers who entered into a contract with the providers of mobile packet communications network 200 concerning the use of mobile packet communications network 200. Specifically, as shown in FIG. 2, subscriber database 500 stores, in association with the contracted subscribers' names, terminal identifiers to distinguish the mobile phones owned by the contracted subscribers, phone numbers of the mobile phones owned by the contracted subscribers, and addresses of the contracted subscribers, e-mail addresses that the communications provider running mobile packet communications network 200 assigned to the contracted subscribers.

<1-2. Mobile Phone>

Figure 3:
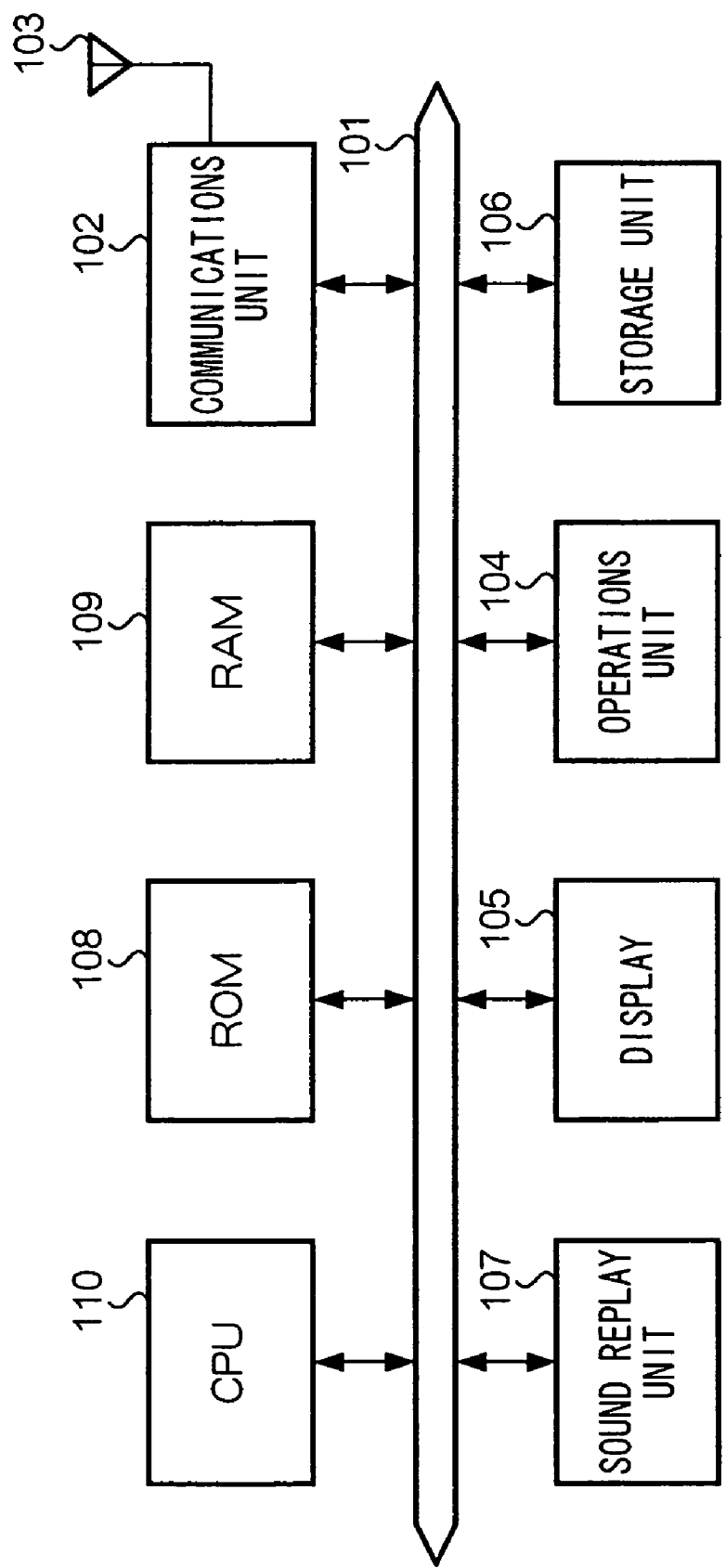
FIG. 3 shows a hardware construction of mobile phone 100.

FIG. 3 is a block diagram that depicts by example the hardware composition of mobile phone 100-1. As shown in FIG. 3, the units of mobile phone 100-1 except for antenna 103 are connected to bus 101 and each unit is capable of data exchange through this bus 101.

Communications unit 102 has an antenna 101, and under the control of CPU (Central Processing Unit) 110, performs wireless communications with base stations in mobile packet communications network 200. Operations unit 104 has multiple keys (not shown) for input of operation instructions. The user of mobile phone 100-1 inputs characters and commands for executing programs, and selects items in a screen, using operations unit 104. Specifically, signals are supplied to CPU 110 in response to user's operations and CPU 110 interprets the signals to thereby control the every units of mobile phone 100-1 in accordance with the user's operation. Display 105, which has an LCD panel (not shown) and control circuitry that controls the LCD panel and the like, displays text, graphic images and the like in the LCD panel under the control of CPU 110. An example of the graphic image is a menu screen displayed when the mobile phone is turned on. Memory 106 has nonvolatile memory (not shown), which may be EEPROM (Electrically Erasable Programmable Read Only Memory) or the like, and stores data for control of mobile phone 100-1 among other operations. Sound replay unit 107 has a speaker (not shown), and, under the control of CPU 110, replays sounds based on sound files.

In ROM (Read Only Memory) 108, various programs are stored that are executed by CPU 110. ROM 108 also stores an OS (Operating System) program that controls the mobile phone 100-1 hardware and the like. Also, in ROM 108, the terminal identifier "MS00001", which is an identifier that uniquely identifies mobile phone 100-1, is stored. RAM (Random Access Memory) 109 is used as a work area for CPU 110, and temporarily stores data used by programs executed by CPU 110.

When power is supplied to mobile phone 100-1, CPU 110 reads out the OS program from ROM 108 and executes it. During the OS program is running, CPU 110 performs processing based on signals received in communications unit 102 and signals output from operations unit 104. For example, when the user directs the execution of e-mail programs, CPU 110 reads out the e-mail program from ROM 108 and executes it. After executing the e-mail program, CPU 110 specifies user instructions based on signals supplied from operations unit 104 and on images displayed in display 105, and performs operations according to those instructions.

Functions relating to transmission and reception of e-mail that mobile phone 100-1 has will now be described. The e-mail program stored in ROM 108 has functions to perform sending and receiving of e-mail using HTTP (Hypertext Transfer Protocol).

(1) Transmission

Figure 4:
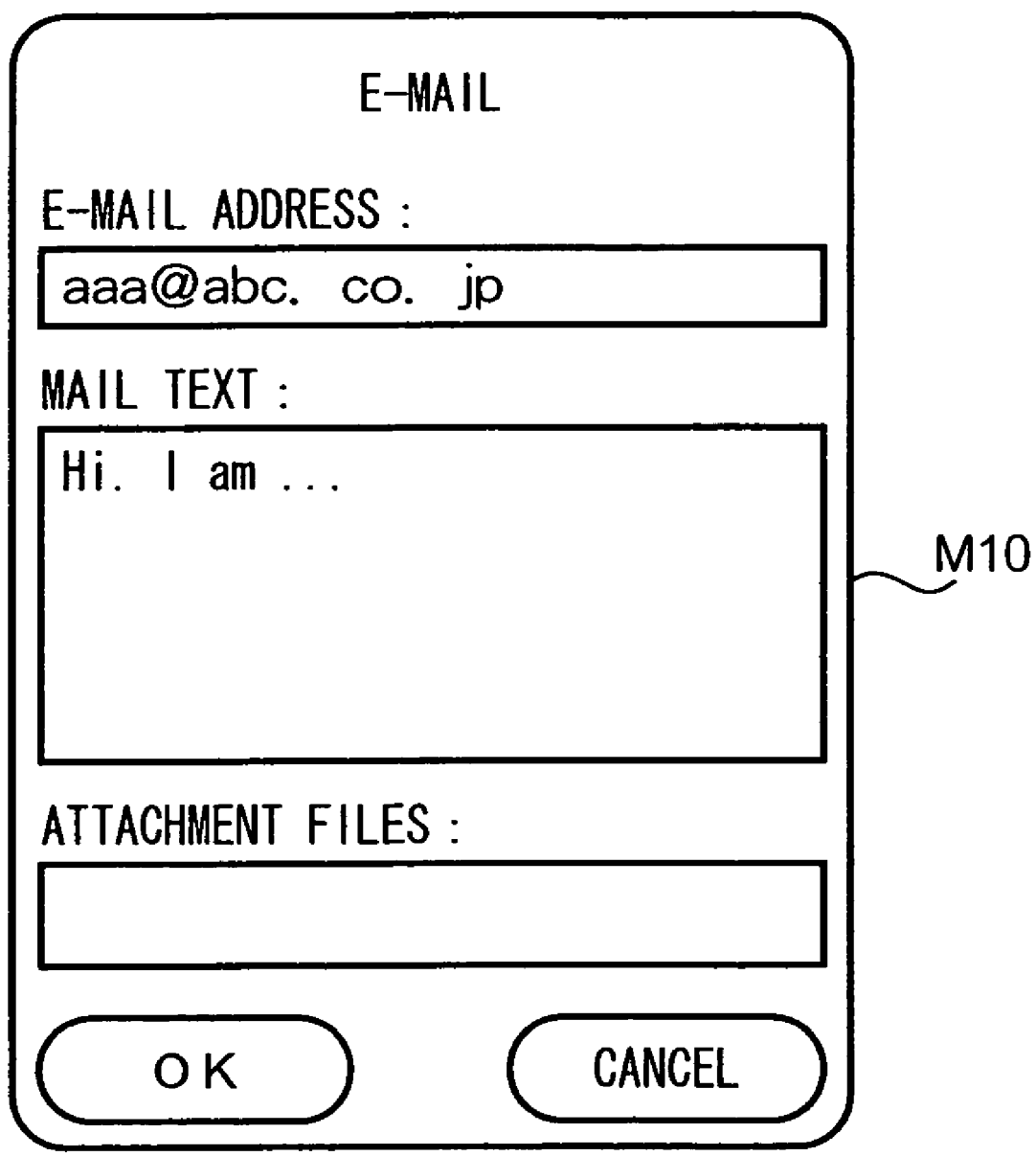
FIG. 4 shows an example of a menu screen for specifying e-mail to be shown in display 105 of mobile phone 100.

When CPU 110 executes the e-mail program, a menu screen M10 depicted in FIG. 4 is displayed in display 105. When the user inputs text of e-mail and an e-mail address which indicates destination of the e-mail and specifies a file to be attached to the e-mail, the text, the e-mail address, and the attachment file are stored in RAM 109. Next, CPU 110 displays the text, the e-mail address, and the attachment file in display 105.

When the user performs an operation to send e-mail using operations unit 104, CPU 110 creates an HTTP request that uses the POST method, including as parameters the e-mail text, the e-mail address, the file to be attached, and the terminal identifier of mobile phone 100-1, all of which have been stored in RAM 109. An example of the generated HTTP request is shown in FIG. 5.

As shown in FIG. 5, the URI (Uniform Resource Identifier) of a CGI (Common Gateway Interface) program executed by the mail server 400 is set as a parameter for the POST method. The terminal identifier is "MS000001" which is set as a parameter of the User-Agent. Finally, the HTTP request is sent to mail server 400.

(2) Reception

When CPU 110 receives from mail server 400 an arrival notice which represents that e-mail destined for the mobile phone 100-1 has reached mail server 400, CPU 110 creates an HTTP request using the GET method to obtain the e-mail from mail server 400. This HTTP request includes the terminal identifier of mobile phone 100-1, a mail identifier for identifying e-mail, and a parameter that specify an extension of an attachment file that mobile phone 100-1 can receive. Specifically, CPU 110 sets as a parameter of the GET method the URI of the CGI (Common Gateway Interface) program executed by mail server 400. An example of the generated HTTP request is shown in FIG. 6. As shown in FIG. 6, "jpeg" is set as a parameter for specifying a file that the mobile phone 100-1 can obtain, "MS000001" is set as a parameter of the User-Agent, and a mail identifier "0001" is set as a parameter of the X-ID. The generated HTTP request is sent to mail server 400.

When CPU 110 receives a HTTP response sent from mail server 400 as a reply to the HTTP request, it extracts the e-mail from that HTTP response, and stores the extracted e-mail in memory 106. In a case where there is a file attached to the e-mail, CPU 110 extracts the attached file from the e-mail, and stores the extracted file in memory 106.

It is to be noted that the e-mail program is capable of receiving any kinds of attachment files. However, if a received attachment file is JPEG or MIDI formatted, mobile phone 100-1 can open the file, otherwise mobile phone 100-1 cannot open it.

Specifically, in a case where a JPEG file is received, mobile phone 100-1 displays, 105 under direction from the user, an image based on the JPEG file in display. For example, CPU 110 reads out the received attachment files stored in memory 106 and displays a list of the files in display 105. When the user selects a file having the "jpeg" extension, CPU 110 displays in display 105 the image based on the selected file.

In a case where e-mail with a file having the "mid" extension attached is received, mobile phone 100-1 replays, under direction from the user, sounds based on the MIDI file. Specifically, when the user performs a predetermined operation, CPU 110 reads out the received attachment files stored in memory 106 and displays a list of the files in display 105.

When the user selects a file having the "mid" extension, CPU 110 causes sound replay unit 107 to replay the sounds based on the selected file.

<1-3. Mobile Phone 100-2>

Mobile phone 100-2 has a composition that is largely identical to that of mobile phone 100-1, and explanation of the identical units is omitted. The points where mobile phone 100-2 differs from mobile phone 100-1 are that the terminal identifier is "MS000002", and that mobile phone 100-2 does not have sound replay unit 107 found in mobile phone 100-1 and thus it cannot handle a music file having the "mid" extension.

<1-4. Mail Server 400>

Figure 9:
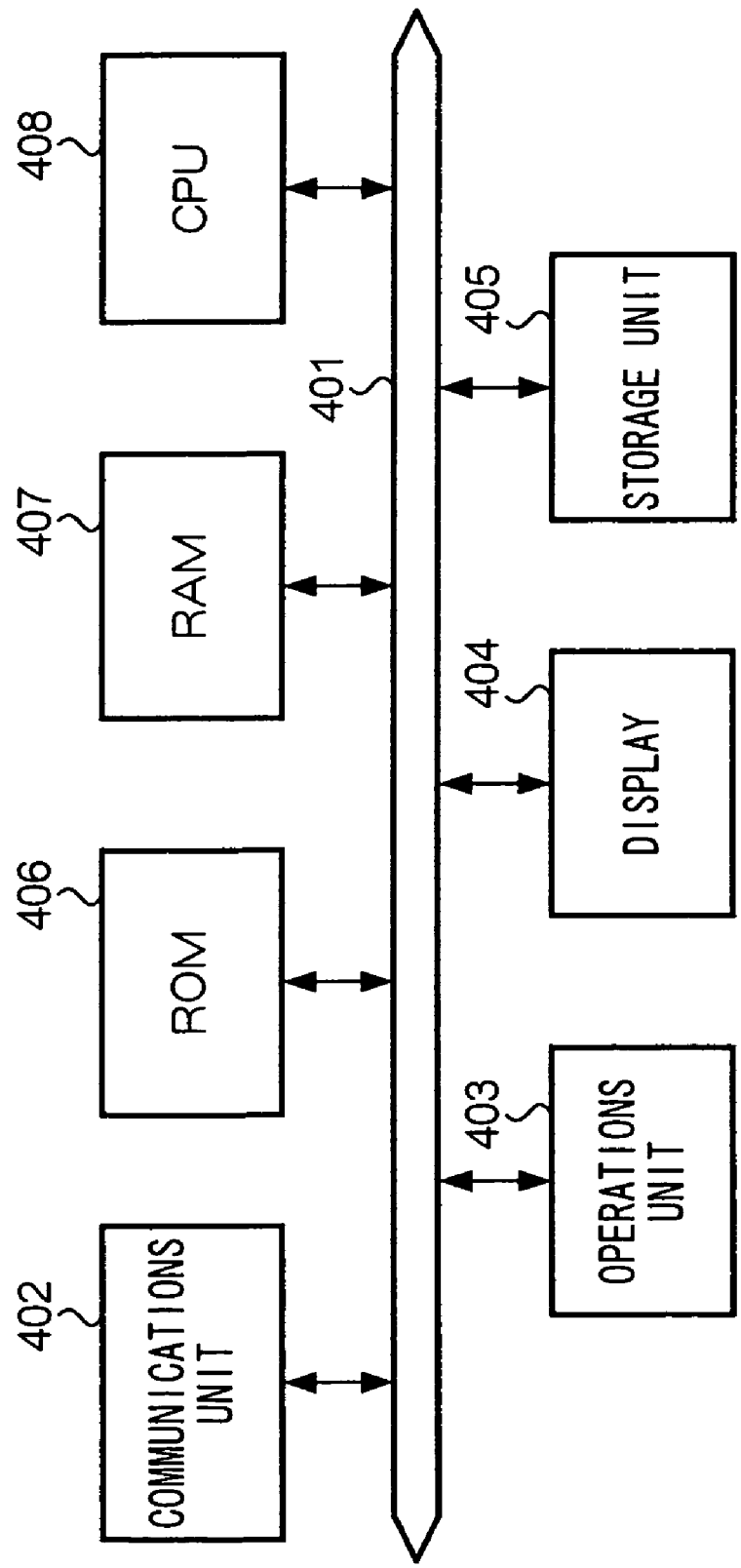
FIG. 9 shows a hardware construction of mail server 400.

FIG. 9 is a block diagram showing by example the hardware construction of mail server 400. As shown in FIG. 9, all units of mail server 400 are connected by bus 401.

Communications unit 402 is a communications interface for performing communications with other apparatus, and is connected with gateway server 300 and mail server 400 via a communications network. Operations unit 403 has a mouse and a keyboard (not shown). When the administrator of mail server 400 operates the keyboard and mouse of operations unit 403, signals are output to CPU 408 in accordance with user's operations. Display 404 has an LCD display (not shown) and a control circuit for controlling the LCD display. When display 404 receives a control signal sent from CPU 408, it displays characters or images based on the signal. Looking at the screen, the administrator performs registration of users, updating mailboxes, and the like.

Memory 405 includes a hard disk or other suitable storages, in which mailboxes for storing e-mail destined for the contracted subscribers' served by mobile packet communications network 200, each mailbox being assigned to a contracted subscriber (namely, a user of a mobile phone 100).

Also, memory 405 stores a control program for controlling mail server 400, a CGI program "send.cgi" for storing in mailboxes e-mail sent from mobile phones served by mobile packet communications network 200 (hereafter "storage CGI"), and a CGI program "receive.cgi" for distributing to mobile phones served by mobile packet communications network 200 the e-mail that has been stored in mailboxes (hereafter, "distribution CGI"). The URI indicating the storage location of the storage CGI is "http://abc.co.jp/send.cgi", and the URI indicating the storage location of the distribution CGI is "http://abc.co.jp/receive.cgi".

ROM 406 stores the IPL (Initial Program Loader). RAM (Random Access Memory) 407 is used as a work area for CPU 408. Data used for programs running by CPU 408 is transferred to RAM 407.

CPU 408 controls all units of mail server 400. When power is supplied to mail server 400, CPU 408 reads out the IPL from ROM 406 and executes it. Next, CPU 408 reads out the control program from memory 405 and executes it.

Functions of e-mail server 400 for distributing e-mail will now be described. The CGI program stored in memory 405 has functions for distributing e-mail sent from mobile phones. Specifically, when CPU 408 receives an HTTP request that has been sent from a mobile phone, it reads out from memory 405 a CGI program corresponding to the HTTP request method and executes it. In the following, using the flowchart of FIG. 10 as an example, the flow of operations that CPU 408 performs when it receives an HTTP request is explained.

First, CPU 408 determines whether it has received an HTTP request sent from a mobile phone (step SB1). In a case where CPU 408 determined that an HTTP request has not been received, CPU 408 continues to wait until it receives the HTTP request (SB1, NO).

In a case where CPU 408 determined YES from step SB1, CPU 408 determines whether the sent HTTP request method is the POST method (SB2). In a case where CPU 408 determined that the HTTP request method was the POST method, CPU 408 reads out the storage CGI from memory 405 and executes it (SB3).

CPU 408 stores the e-mail which is included in the received HTTP request in a mailbox in memory 405 (SB4). The operations to store e-mail in the mailboxes are explained later in detail.

In a case where CPU 408 determined "NO" from step SB2, CPU 408 determines whether the received HTTP request method was the GET method (SB5). In a case where HTTP request method was the GET method, CPU 408 reads out from memory 405 the distribution CGI and executes it (SB6). Next, CPU 408 distributes e-mail stored in the mailboxes of memory 405 to mobile phones served by mobile packet communications network 200 (SB7). In a case where CPU 408 determined "NO" for step SB5, the procedure returns to step SB1 and CPU 408 waits for an HTTP request to be sent.

(1) E-mail Storage Operations

Figure 10:
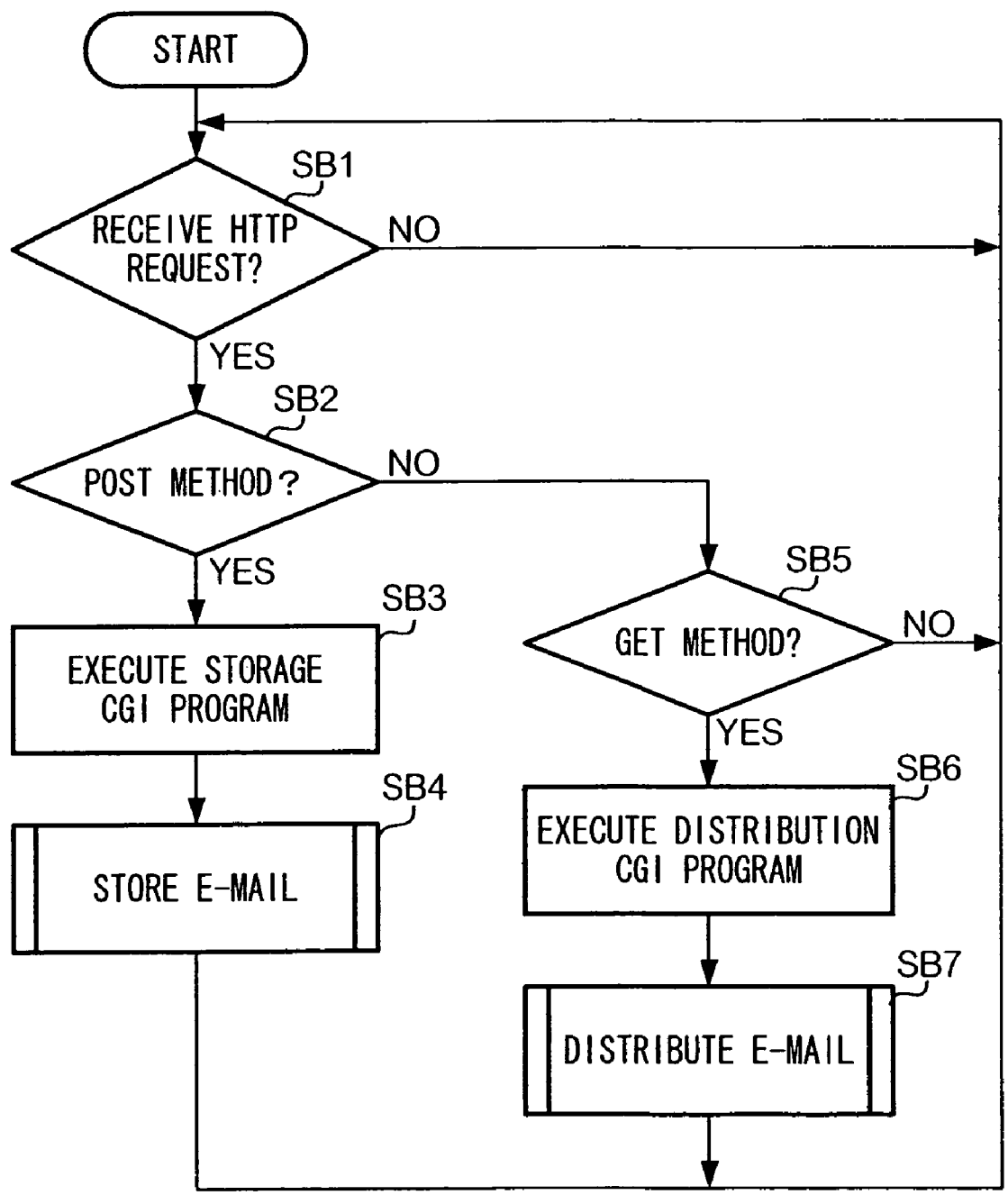
FIG. 10 shows a flowchart illustrating for an e-mail distribution according to the present invention performed by mail server 400.
Figure 11:
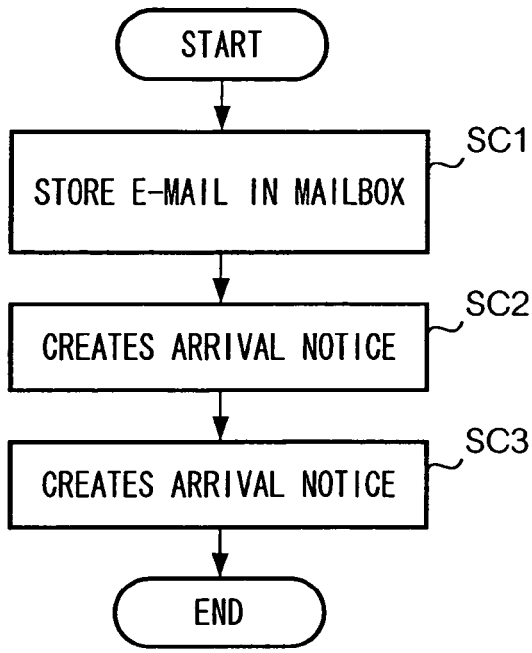
FIG. 11 shows a flowchart of operations of a storage CGI executed by mail server 400.

Next, the flow of operations performed due to the execution of the storage CGI described in step SB4 of FIG. 10 will be explained using the flow chart of FIG. 11.

When CPU 408 executes the storage CGI, it searches for mailboxes stored in memory 405 using as key the mail address that indicates the e-mail addressee included in the HTTP request used by the POST method sent from mobile phone 100. When CPU 408 finds the mailbox, it creates a mail identifier to identify the received e-mail. Next, CPU 408 stores in the corresponding mailbox the e-mail text included in the HTTP request, the terminal identifier of the mobile phone 100, which is a sender of the HTTP request, the attachment file (only if a file is attached to the e-mail), and the mail identifier (step SC1).

Next, CPU 408 creates an arrival notice to indicate that the e-mail destined for the user of the mobile phone specified by the mail address included in the HTTP request has been sent (SC2). In this arrival notice, the mail identifier of the e-mail stored in the mailbox is included.

Next, in order to specify the mobile phone to which the arrival notice should be sent, CPU 408 searches the subscriber database 500 using as a key the mail address included in the HTTP request indicating the e-mail addressee. When CPU 408 finds the mail address, it reads out from subscriber database 500 the terminal identifier which is stored in correspondence with that e-mail address. Next, CPU 408 sends the created arrival notice to the mobile phone specified by the terminal identifier (SC3). Thus far, execution of the storage CGI has been completed.

(2) E-mail Distribution Operations

Figure 12:
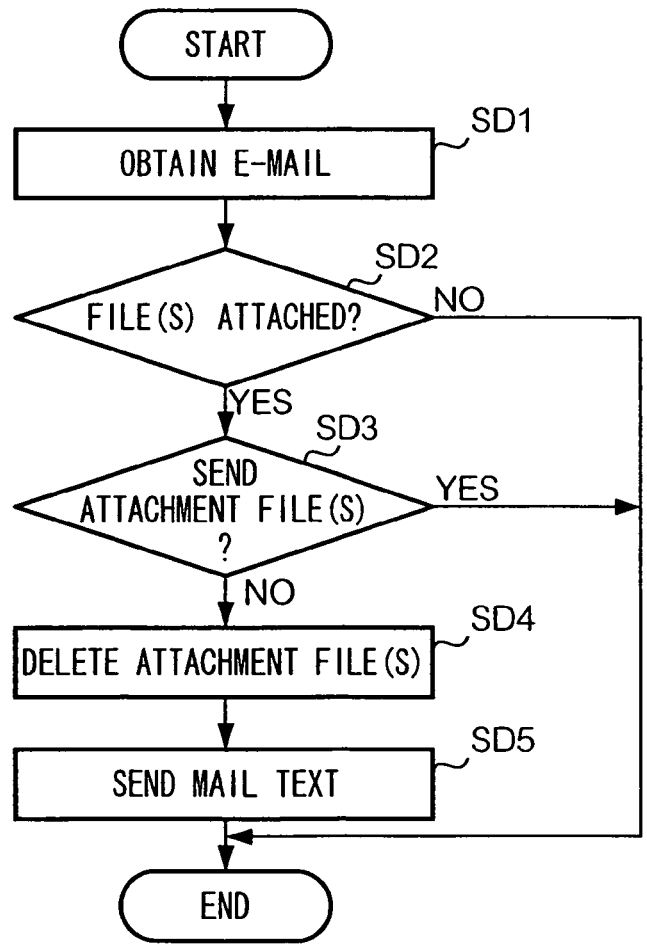
FIG. 12 shows a flowchart illustrating operations of a distribution CGI executed by mail server 400.

Next, the flow of operations of executing the distribution CGI, which are performed by step SB7 of the flowchart in FIG. 10, will be described with reference to the flowchart in FIG. 12.

When CPU 408 executes the distribution CGI, it searches the subscriber database 500 using as a key the terminal identifier included in the HTTP request sent from mobile phone 100 using the GET method. When CPU 408 finds the terminal identifier, it reads out the e-mail address stored in association with the terminal identifier.

Next, using as a key the e-mail address, CPU 408 searches for the mailbox of memory 405. When CPU 408 finds the mailbox, it reads out from the mailbox the e-mail specified by the mail identifier included in the HTTP request (step SD1).

Next, CPU 408 determines whether the e-mail has a file attached (SD2). In a case where CPU 408 decided that the e-mail has no file attached ("NO" in step SD2), it proceeds to the operations of step SD5.

In a case where CPU 408 determined that a file is attached ("YES" in step SD2), it compares the extension of the file attachment, which is set as a distribution CGI parameter in the HTTP request, with the extension of the file that has been attached to the e-mail which is read out from the mailbox.

In a case where CPU 408 determined that those two above extensions are the same ("YES" in step SD3), it is assumed that the file should be sent to the mobile phone specified by the terminal identifier included in the HTTP request, and thus CPU 408 continues to the operations of step SD5. In a case where CPU 408 determined that those two above extensions are not the same ("NO" in step SD3), it is assumed that the user of the mobile phone does not want to receive the file attached to the e-mail read out, and thus CPU 408 deletes the attachment from the e-mail (SD4).

Next, CPU 408 creates an HTTP response that includes the e-mail from which the file attachment was deleted or the e-mail that still has the attachment, and sends the created HTTP response to the mobile phone specified by the terminal identifier included in the HTTP request (SD5).

<2. Example Operations of the Preferred Embodiment>

Next, example operations relating to e-mail transmission/reception between mobile phone 100 and mail server 400 of this embodiment will be explained.

(1) Setting of the Extensions of the Attachment Files

First, the user of mobile phone 100 sets extensions of the attachment files which the user wishes to obtain. In the following, an example of the flow of operations performed by CPU 110 will be described with reference to FIGS. 7 and 8.

Figure 7:
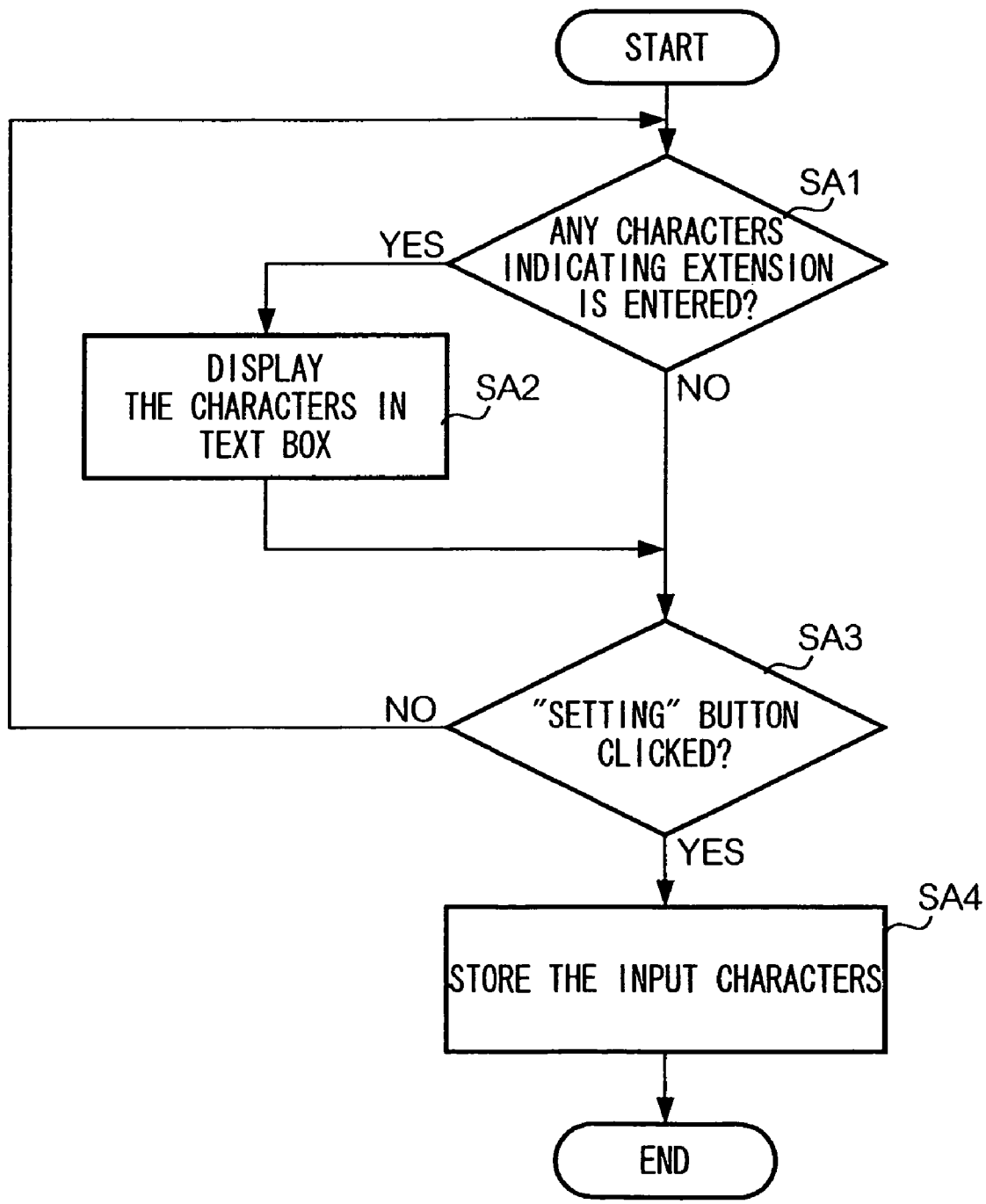
FIG. 7 shows a flowchart that illustrates operations performed by mobile phone 100 to set extensions of attachment files desired by a user of mobile phone 100.
Figure 8:
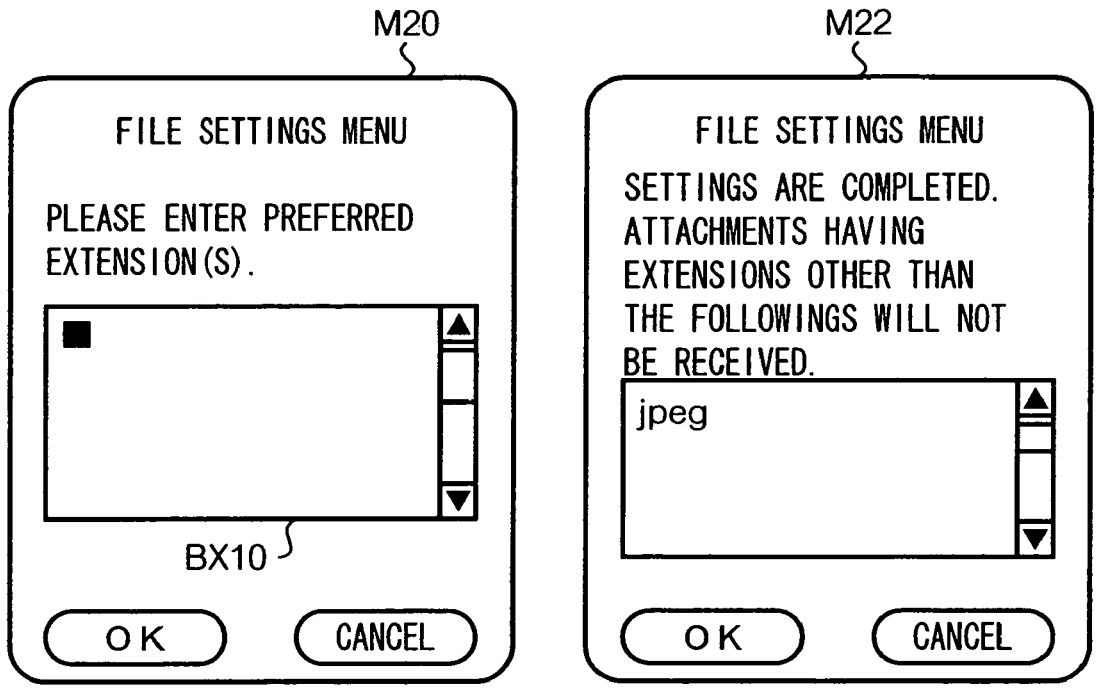
FIG. 8 shows settings menu screens that will be displayed in display 105 of mobile phone 100 for setting extensions of attachment files that a user wishes to download according to the present invention.
Figure 8:
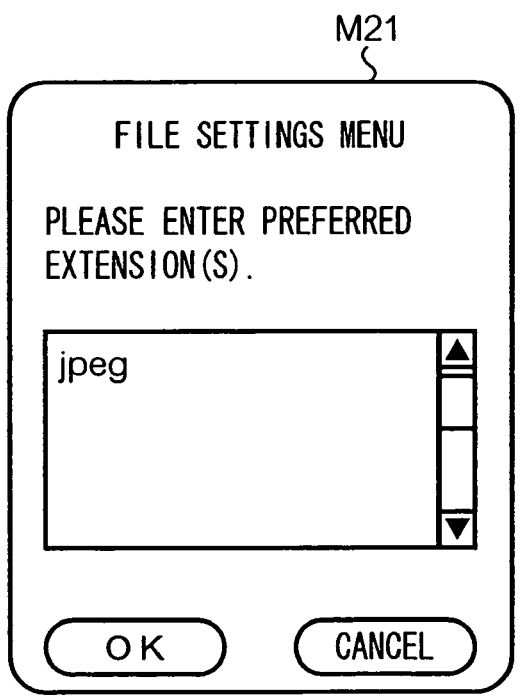

When the user of mobile phone 100 performs a predetermined operations, CPU 110 displays settings menu screen M20 shown in FIG. 8 in display 105. When the user operates mobile phone 100-1 during menu screen M20 is displayed, CPU 110 determines, based on signals supplied by operations unit 104, whether the user's operations are input of characters (a character string) that represents any extensions into text box BX10 of settings menu screen M20 (step SA1 of FIG. 7).

In a case where CPU 110 determines that the user's operations are input of characters ("YES" in step SA1 of FIG. 7), displays the characters input by the user in text box BX10 of the setting menu screen M20 (SA2 of FIG. 7). It is assumed in the following description that the characters "jpeg" was input in text box BX10. In this case, settings menu screen M21 will be displayed in display 105, as shown in FIG. 8.

In a case where CPU 110 determines that the user's operations are not input of characters, CPU 110 further determines, based on the supplied signals from operations unit 104, whether the user's operation is a click of the "settings" button in settings menu screen M20 (step SA3 of FIG. 7). In a case where CPU 110 determines that the user's operation is not a click of the "settings" button ("NO" in step SA3), the procedure returns to step SA1.

In a case where CPU 110 determines that the user's operation is a click of the "settings" button ("YES" in step SA3 in FIG. 7), CPU 110 extracts the characters "jpeg" that has been input in the text box BX10 of the setting menu screen M20, and stores it in memory 106 (SA4). In the following description, it is assumed that the settings button M21 was clicked.

After storing the character sets representative of the extensions, CPU 110 displays settings menu screen M22 shown in FIG. 8 in display 105, so as to notify to the user that the settings of the extensions of the preferred file attachments have been completed.

(2) Transmission/reception of E-Mail

Figures 13, 14:
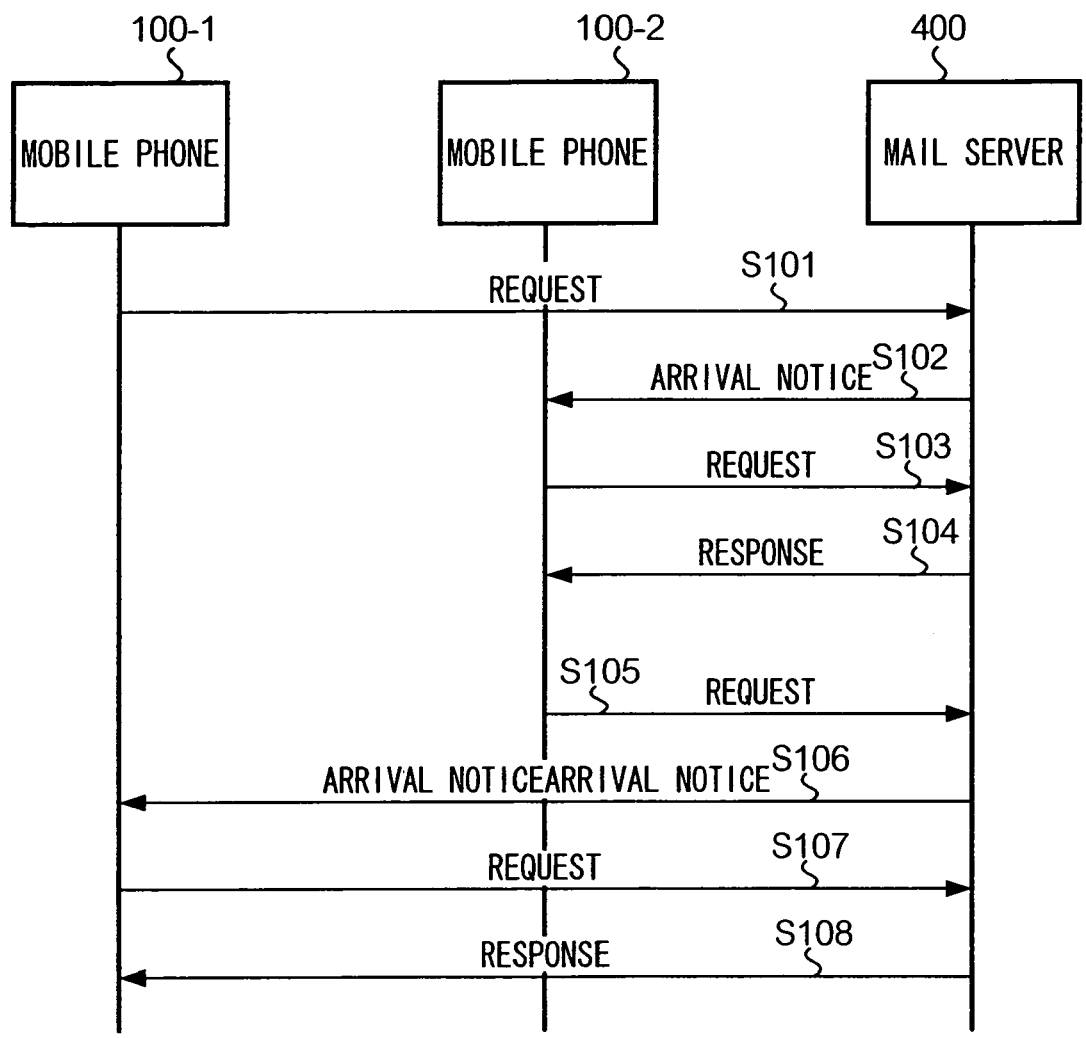
FIG. 13 shows sequences of operations of sending/receiving e-mail.
FIG. 14 shows an example of a format of an HTTP request sent to mail server 400 by mobile phone 100-2.

Next, with reference to FIG. 13, the operations performed when sending/receiving e-mail to be distributed from mail server 400 to mobile phones 100-1 and 100-2 after settings of the extensions are completed described above will be described. With the operations mentioned above, it is assumed that the power is already supplied, and that mobile phones 100-1 and 102 are ready to be served by mobile packet communications network 200 since location registrations of the mobile phone are already completed. Also, it is assumed that the users of mobile phones 100-1 and 100-2 have set "jpeg" as an extension of attachment files to obtain. Also, it is assumed that e-mail addresses of the mobile phones 100-1 and 100-2 are "taro@abc.co.jp" and "hanako@abc.co.jp", respectively.

First Embodiment

First, description will be made for a case where e-mail that has attached an "music1.mid" having the "mid" extension is sent from mobile phone 100-1 to mobile phone 100-2.

The user of mobile phone 100-1 first creates e-mail by inputting the mail address "hanako@abc.co.jp" of the user of mobile phone 100-2 and mail text, and attaching "music1.mid".

Next, when the user of mobile phone 100-1 performs operations to send the created e-mail, an HTTP request using the POST method is created by CPU 110. This HTTP request includes, as a parameter of the POST method, the URI "http://abc.co.jp/send.cgi" of the storage CGI stored in mail server 400, and also includes the mail address entered by the user, the mail text, the attachment file, and the terminal identifier "MS000001" of the mobile phone 100-1. The created HTTP request is sent from mobile phone 100-1, and is received using the communications unit 402 of mail server 400 (step S101).

The HTTP request received by means of communications unit 402 is sent to CPU 408 of mail server 400. When CPU 408 receives the HTTP request, it reads out from memory 405 the storage CGI specified by the URI, the URI being a parameter of the POST method, and executes the storage CGI. Next, CPU 408 stores the mail text, the terminal identifier of mobile phone 100-1 that represents the sender of the e-mail and attachment files, both of which have been included in the HTTP request, and the created mail identifier, correspondingly.

Next, CPU 408 creates an arrival notice that indicates that mail server 400 has received e-mail destined for the user of mobile phone 100-2. In this arrival notice, the mail identifier of the e-mail stored in the mailbox is included. Next, in order to specify the mobile phone to which the arrival notice is to be sent, CPU 408 searches for subscriber database 500 using as key "hanako@abc.co.jp" which is the mail address that indicates the e-mail addressee. When CPU 408 finds the mail address "hanako@abc.co.jp" in the data shown in FIG. 2, it extracts from subscriber database 500 the terminal identifier "MS000002", which is stored in association with the e-mail.

CPU 408 sends the created arrival notice to mobile phone 100-2 specified by the extracted terminal identifier (step S102). The arrival notice sent from mail server 400 is received by communications unit of mobile phone 100-2 and then supplied to CPU 110.

Upon receipt of the arrival notice, CPU 110 creates an HTTP request that uses the GET method to obtain the e-mail stored in the mailbox of mail server 400. This HTTP request has as a parameter to the GET method the URI "http://abc.co.jp/receive.cgi" of the distribution CGI stored in mail server 400, as shown in FIG. 14. Also, the parameter of the distribution CGI is set as "jpeg", indicating the extension of the file to obtain. This HTTP request includes the terminal identifier "MS000002" of mobile phone 100-2 and mail identifier "0001" for the e-mail which will be obtained by mobile phone 100-1.

The created HTTP request is received from mobile phone 100-2 (step S103) is received by communications unit 402 of mail server 400, and then sent to CPU 408. Upon receipt of the HTTP request, CPU 408 reads out from memory 405 the distribution CGI specified by the URI, the URI being a parameter of the GET method, and executes the distribution CGI.

When CPU 408 executes the distribution CGI, it searches for subscriber database 500 using as key the terminal identifier "MS000002" included in the HTTP request, to extract from subscriber database 500 the e-mail address "hanako@abc.co.jp" stored in association with that terminal identifier.

Next, CPU 408 searches for a mailbox in memory 405 using as a key the extracted e-mail address "hanako@abc.co.jp". When CPU 408 finds the mailbox, it reads out from the mailbox the e-mail specified by the mail identifier "0001". CPU 408 determines whether to send the attachment file to mobile phone 100-2 specified by the terminal identifier.

While the extensions of the attachment files to obtain for mobile phone 100-2 have been set to be only "jpeg" as a CGI parameter, the extension of file attached to the e-mail is "mid". Thus, CPU 408 determines not to send the attachment file to mobile phone 100-2 and deletes the file "music1.mid" from the e-mail.

Next, CPU 408 creates an HTTP response that includes the e-mail from which the attachment file was deleted. The HTTP response created is sent to mobile phone 100-2 from mail server 400 (step S104).

When mobile phone 100-2 receives an HTTP response from communications unit 102, the HTTP response is supplied to CPU 110. CPU 110 extracts the e-mail from the HTTP response, and stores the extracted e-mail in memory 106.

Second Embodiment

Description will be made for a case where e-mail to which a JEPG formatted image file "image1.jpeg" is attached is sent from mobile phone 100-1 to mobile phone 100-2.

When the user of mobile phone 100-2 enters the mail address "taro@abc.co.jp" indicating the addressee of the e-mail and the mail text, attaches "image1.jpeg", and performs operations to send the e-mail, CPU 110 creates an HTTP request that uses the POST method, the HTTP request including the mail address, the mail text, the attachment file, and the terminal identifier "MS000002" of the mobile phone 100-2.

In this HTTP request, the URI of the storage CGI stored in mail server 400 is set as parameter for the POST method, and the mail address entered by the user, the mail text, the attachment file, and terminal identifier "MS000002" of mobile phone 100-2 are included. The created HTTP request is sent to mail server 400 (step S105). The HTTP request is received by means of communications unit 402 and then supplied to CPU 408.

When CPU 408 receives the HTTP request, it reads out form memory 405 the storage CGI specified by URI, the URI being a parameter of the POST method. Specifically, CPU 408 searches for a mailbox in storage unit 405 using as key the mail address "taro@abc.co.jp" included in the HTTP request.

When CPU 408 finds the mailbox, it creates a mail identifier to identify the e-mail. CPU 408 stores in the mailbox the mail text, the terminal identifier of mobile phone 100-2, the attachment file, and the mail identifier, which are included in the HTTP request, correspondingly.

Next, CPU 408 creates an arrival notice to indicate that e-mail destined for the user of mobile phone 100-1 has been sent. The notice includes the address of the e-mail stored in the mailbox.

Next, in order to specify mobile phone 100-1 to which the arrival notice it to be sent, CPU 408 searches for subscriber database 500 using as key the mail address "taro@abc.co.jp", which represents the addressee of the e-mail, so as to extract the terminal identifier "MS000001" which is stored in association with the mail address "taro@abc.co.jp".

CPU 408 sends the created arrival notice to the mobile phone 100-1 specified by the extracted terminal identifier (step S106). The arrival notice sent from mail server 400 is received by mobile phone 100-1 and supplied to CPU 110 of the mobile phone of mobile phone 100-1.

Upon receipt of the arrival notice, CPU 110 creates an HTTP request using the GET method to obtain the e-mail stored in the mailbox of mail server 400. In this HTTP request, the URI of the distribution CGI stored in mail server 400 is set as a parameter for the GET method, as shown in FIG. 6. The parameter of the distribution CGI has been set as "jpeg" indicating the extension of the file to obtain. Also, this HTTP request, as shown in FIG. 6, includes the terminal identifier "MS000001" of mobile phone 100-1 and the mail identifier "0001" of the e-mail that will be obtained. The created HTTP request is sent from mobile phone 100-1 (step S107), received by the communications unit 402 of mail server 400, and then supplied to CPU 408.

When CPU 408 receives the HTTP request, it reads out from memory 405 the distribution CGI specified by the URI, the URI being a parameter of the GET method, and executes the distribution CGI. Specifically, CPU 408 searches subscriber database 500 using as key the terminal identifier "MS000001" included in the HTTP request. As a result, the e-mail address "taro@abc.co.jp" stored in association with the terminal identifier "MS000001" is extracted.

Next, CPU 408 searches for a mailbox in memory 405 using as key the e-mail address extracted from subscriber database 500. As a result, the e-mail address specified by the mail identifier is extracted from the mailbox assigned to the user of the mobile phone 100-1.

CPU 408, determines whether to send the attached file to mobile phone 100-1 specified by the terminal identifier. While the extension of the attachment file that mobile phone 100-1 can obtain has been set as a CGI parameter "jpeg", the extension of the file attached to the extracted e-mail is also "jpeg". Therefore, CPU 408 determines to send the file to mobile phone 100-1. Next, CPU 408 creates an HTTP response that includes the e-mail with the file attached as it is. The created HTTP response is sent to mobile phone 100-1 from mail server 400 (step S108).

In the mobile phone 100-1, when the HTTP response is received by means of communications unit 102, the received HTTP response is supplied to CPU 110. When CPU 110 receives the HTTP response, it extracts the e-mail from the HTTP response and stores the extracted e-mail in memory 106.

As in the above explanation, in this preferred embodiment, it is possible that the user of mobile phone 100 allows mobile phone 100 to receive only files having extensions that are preferred by the user. Also, the user of mobile phone 100, with one-time setting for the mobile phone of the extensions of attached files to obtain, there will be no need to perform operations to determine whether to accept attachment files each time e-mail is received. This is because the settings will automatically be affected to subsequent HTTP requests.

<3. Modifications>

With the above embodiment, mobile phone 100 is capable of using image files and sound files; however, the kinds of files that can be used in mobile phone 100 are not restricted to image files and sound files. Mobile phone 100 may use other types of files and files with other extensions.

Figure 15:
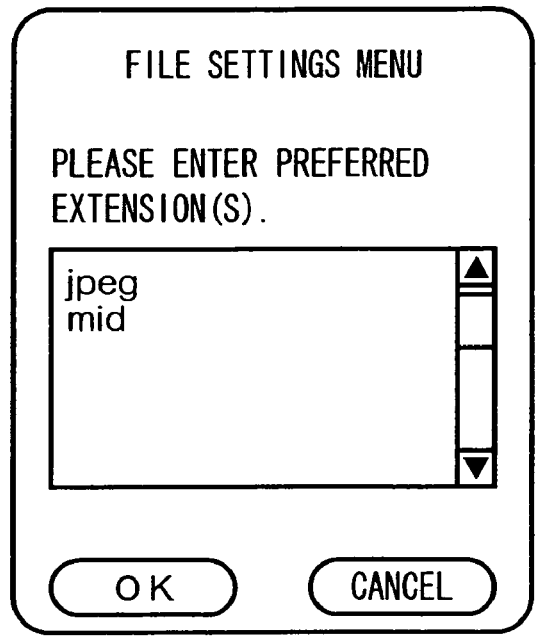
FIG. 15 shows a settings menu screen for setting of multiple extensions of attachment files to be received.
Figure 16:
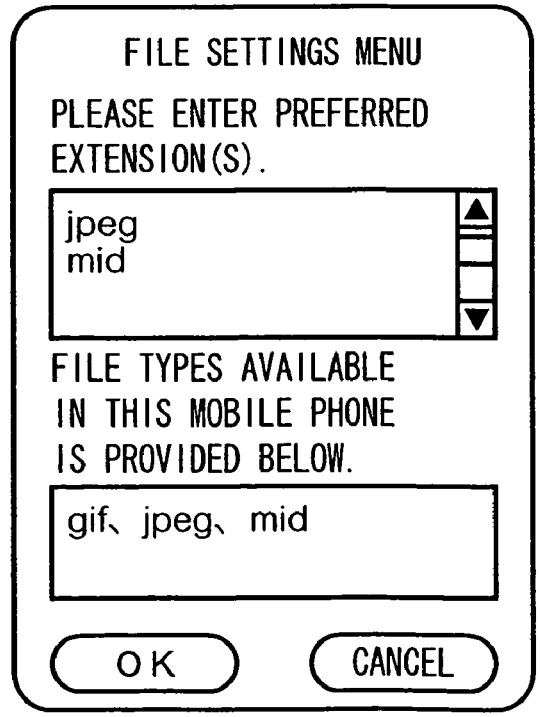
FIG. 16 shows a settings menu screen for setting extensions of attachment files preferred by the user.
Figures 17, 18:
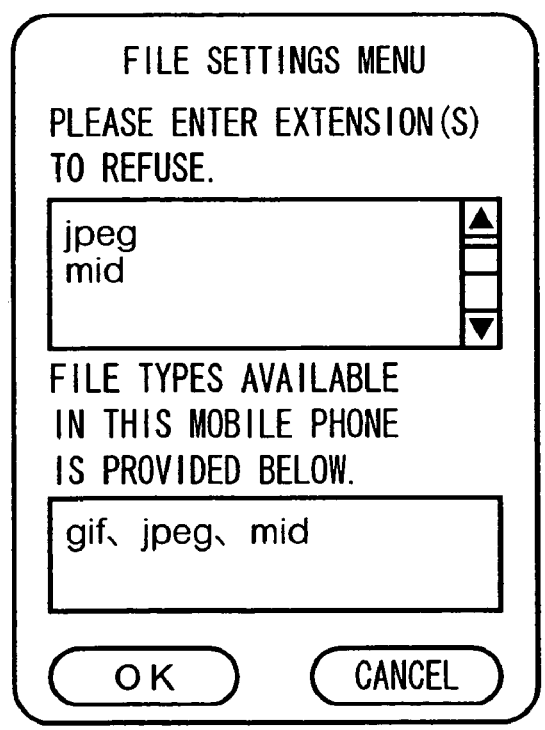
FIG. 17 shows a header of an HTTP request used in a GET method sent from mobile phone 100 according to the present invention.
FIG. 18 shows settings menu screens for setting extensions of attachment files preferred by the user.

With the above embodiment, the user of mobile phone 100, when setting the extensions of the attached files to obtain, may set not just a single extension, but as in FIG. 15 may set several in mobile phone 100 for files to obtain. In this case, the extensions of files available in mobile phone 100 may be stored in advance in memory 106 of mobile phone 100, so that CPU 110 can display in display 105 of mobile phone 100 the settings menu screen as shown in FIG. 16 when the user sets the extensions of attachment files to obtain. With this implementation, the user of mobile phone 100 is able to choose a plurality of extensions of files that the user accepts among other files available in mobile phone 100. For example, if the extensions "jpeg", "mid", and "gif" are specified, the header of the GET method will be as shown in FIG. 17. When mail server 400 receives that HTTP request, CPU 408 determines whether extensions of files attached to the e-mail destined for mobile phone 100 is identical to any of the specified extensions.

Alternatively, it is possible to specify extensions of files that the user doesn't wish to obtain, as shown in FIG. 18. In this case, CPU 110 of mobile phone 100 creates a header of the HTTP request, the header including as parameters the extensions of files by excluding the files specified by the user from all files available in mobile phone 100.

With the above implementations, the user of mobile phone 100 is able to confirm extensions available in mobile phone 100 easily, namely, without looking at manuals or instructions. Thus, usability will further increase.

In a case where multiple selection of extensions is allowed, it is possible to employ a CGI parameter which indicates that all files are accepted rather than specifying each and every files acceptable by the user. For example, when the user desires to specify all files available in mobile phone 100, a parameter "ATT=allfig" is set instead of "?ATT=jpeg" in FIG. 6. Alternatively, it is possible to set a parameter "ATT=none" instead of "?ATT=jpeg" when the user does not wish to receive any attachment files. When mail server 400 receives a HTTP request, it transfers every attachment files to mobile phone 100 in a case where the parameter is set as "allfig". In a case where the parameter is set as "none", all attachment files are deleted before sending to the mobile phone 100.

In the above embodiment, the extensions of files are specified by entering characters in the text boxes by the user. However, the extension setting method is not restricted to text boxes, and other means of selection such as pull-down menus may be used.

In the above embodiment, e-mail is transmitted between mobile phones 100-1 and 100-2, both of which are served by the mobile packet communications network 200. However, e-mail transmission is not restricted to mobile packet communications network 200. Mobile packet communications network 200 may transmit e-mail through Internet connections, via gateway server 300, to a personal computer connected to the Internet.

In the above embodiment, by setting as parameters of the CGI the extensions of files to obtain, mobile phone 100 notifies the mail server 400 of extensions of files to obtain. However, the method of notifying mail server 400 of these preferred extensions is not restricted to that method. By providing a new header in the request header of the HTTP request, it may set the extensions of attachment files to obtain with that header.

In the above embodiment, mail server 400, after sending e-mail to mobile phone 100, leaves the sent e-mail in the mailbox. However, it may delete the sent e-mail from the mailbox after sending the e-mail to mobile phone 100.

In the case of this implementation, after mail server 400 receives confirmation message indicating that the e-mail was received by the mobile phone, mail server 400 may delete the e-mail.

In the above embodiment, attachment files of the e-mail received by mobile phone 100 is stored in memory 106 of mobile phone 100. However, with mobile phone equipped with IMT-2000, it is possible to store attachment files in a UIM. UIM (User Identity Module) is an IC card that is comprised of nonvolatile memory for storing subscriber information, and is embedded in a mobile phone conforming to IMT-2000 (International Mobile Telecommunications 2000).

In the case of such an implementation, it is possible to detach UIM that stores attachment files from a mobile phone and attach it to another mobile phone which is capable of handling the file, if mobile phone 100 receives from mail server 400 a file that the mobile phone 100 cannot open. By doing so, the settings of extensions of files are not effected by the capability of the mobile phone 100. As a result, file usage patterns can diversified and thus usably will increase.

The provider that created the control program, the storage CGI, and the distribution CGI, which are executed on a mail server, may provide to the mail server via a network such as the Internet. Alternatively, these programs may be provided to the sever in storage media like CD-ROM (Compact Disk Read Only Memory) and DVD-ROM.

With the above embodiment, the programs executed on mobile phone 100 are stored in ROM 108, but they may be stored in electrically rewritable memory such as flash memory. In the case of the above implementation, it is possible to provide programs that can be executed in mobile phone 100 through the mobile packet communications network 200 or the Internet. In a case where the programs executed in the mobile phone have been recorded in a storage medium, it is possible to read out programs from the storage medium using a personal computer and to store those programs in the flash memory of the mobile phone, by connecting the mobile phone 100 with the personal computer wired or wirelessly.

The invention claimed is:

1. An e-mail distribution method for sending an e-mail with at least one attachment file from a server apparatus to a communications terminal, the method comprising:

obtaining type information that identifies a type of an attachment file, the type information being indicative of at least one of an attachment file that a user of the communications terminal desires to receive or an attachment file that the user of the communication terminal does not desire to receive;

storing the type information in a memory of the communications terminal;

receiving an arrival notice from the server apparatus indicating that an e-mail is to be routed to the communication terminal;

automatically generating, by the communication terminal, a request for the email destined for the communication terminal, the request including data indicating the type information stored in the memory, the automatically generating being triggered by receipt of the arrival notice from the server apparatus;

sending the request that includes the data indicating the type information to said server apparatus from the communications terminal;

receiving the data indicating the type information in the server apparatus;

comparing, after receipt of the request at the server apparatus, a type of an attachment file of the e-mail identified in the arrival notice, which is destined for the communications terminal and received by the server apparatus, with a type identified by the type information;

deleting the attachment file of the e-mail in the arrival notice based on the comparison of the type of the attachment file of the e-mail with the type identified by the type information; and sending from the server apparatus to the communications terminal the e-mail identified in the arrival notice.

2. The method of claim 1, wherein said obtaining step the communications terminal displays types of available files used in the communications terminal.

3. The method of claim 1, wherein the communications terminal further includes detachable memory, and the method further comprising a storing step of receiving at the communications terminal email transmitted in said sending step and storing the attachment file of the received e-mail in said memory.

4. The method of claim 1, wherein in obtaining step information for identifying a type of attachment file which the user doesn't desire to receive is first obtained and then the type information is generated on the basis of information thus obtained.

5. A communications terminal comprising:
an obtaining means for obtaining type information that identifies a type of an attachment file, the type information being indicative of at least one of an attachment file which a user of the communications terminal desires to receive or an attachment file that the user of the communication terminal does not desire to receive;
a memory that stores the obtained type information;
a receiving means for receiving an arrival notice from the server apparatus indicating that an e-mail is to be routed to the communication terminal;
a generating means for automatically generating request for the e-mail destined for the communication terminal, the request including data indicating the type information stored in the memory, the automatically generating by the generating means being triggered by receipt of the arrival notice from the server apparatus;
a transmitting means for transmitting the generated request that includes the data indicating the type information to a server apparatus; and
a receiving means for receiving an e-mail from the server apparatus, the server apparatus determining whether or not to delete an attachment file in the email prior to sending the e-mail to the communication terminal by comparing the data indicating type information from the request with data indicating type of the attachment file in the e-mail.

6. The communications terminal of claim 5, further comprising means for notifying types of available files used in the communications terminal to a user of the communications terminal.

7. The communications terminal of claim 5, further comprising means for storing an attachment file of a received e-mail to a detachable memory.

8. The communications terminal of claim 5, wherein said obtaining means receives information that identifies an extension of an attachment file which the user doesn't desire to receive, and generates the type information on the basis of information thus received.

9. A server apparatus comprising at least one memory:
means for transmitting an arrival notice to a communications terminal upon receipt of an email destined for the communications terminal;
means for receiving from a communications terminal a request requesting an e-mail destined for the communications terminal, the request including data indicating type information that identifies a type of an attachment file a user of the communications terminal desires to receive, the sending of the request being automatically triggered by the receipt of the arrival notice at the communications terminal, the data in the request being stored in a memory in the communications terminal;
means for comparing, using the at least one memory, a type of an attachment file of the e-mail identified in the arrival notice, which is destined for the communications terminal and received by the server apparatus, with a type extracted from the data indicating the type information;
means for deleting the attachment file of the e-mail in the arrival notice based on the comparison of the type of the attachment file of the e-mail with the type identified by the type information; and
means for sending to the communications terminal the e-mail from which the attachment file is deleted, when the type of the attachment file of the e-mail is not identical to the type identified by the type information, and transferring the e-mail to the communications terminal, when the type of the attachment file of the e-mail is identical to the type identified by the type information.

10. The method of claim 1, wherein the request complies with GET method of HTTP and includes a CGI parameter representative of an extension of an attachment file which the user of the communications terminal wishes to receive.

11. The communications terminal of claim 5, wherein the request complies with the GET method of HTTP and includes a CGI parameter representative of an extension of an attachment file which the user of the communications terminal wishes to receive.

12. The method of claim 1, wherein sending from the server apparatus to the communications terminal the e-mail in the arrival notice is performed only after the server apparatus receives the data indicating the type information from the terminal apparatus, the terminal apparatus sending the type information in response to the arrival notice indicating that the e-mail is to be routed to the communication terminal.

13. The method of claim 12, wherein the request includes data for indicating the e-mail identified in the arrival notice.

14. The method of claim 12, wherein the arrival notice includes the data for indicating the e-mail.

15. The method of claim 1, wherein comparing the type of an attachment file of the e-mail identified in the arrival notice with the type identified by the type information comprises determining whether the type of the attachment file of the e-mail identified in the arrival notice is identical to the type identified by the type information; and deleting the attachment file of the e-mail in the arrival notice if the type of the attachment file of the e-mail identified in the arrival notice is identical to the type identified by the type information.

16. The server apparatus of claim 9, wherein the arrival notice includes the data for indicating the e-mail; and wherein the request includes data for indicating the e-mail identified in the arrival notice.

17. The server apparatus of claim 9, wherein comparing the type of an attachment file of the e-mail identified in the arrival notice with the type identified by the type information comprises determining whether the type of the attachment file of the e-mail identified in the arrival notice is identical to the type identified by the type information; and deleting the attachment file of the e-mail in the arrival notice if the type of the attachment file of the e-mail identified in the arrival notice is identical to the type identified by the type information.

* * * * *